United States Patent [19]

Donovan

[11] Patent Number: 5,781,241
[45] Date of Patent: Jul. 14, 1998

[54] APPARATUS AND METHOD TO CONVERT COMPUTER GRAPHICS SIGNALS TO TELEVISION VIDEO SIGNALS WITH VERTICAL AND HORIZONTAL SCALING REQUIRING NO FRAME BUFFERS

[75] Inventor: Timothy J. Donovan, Milpitas, Calif.

[73] Assignee: Chrontel, Inc., San Jose, Calif.

[21] Appl. No.: 745,606

[22] Filed: Nov. 8, 1996

[51] Int. Cl.[6] .................................................. H04N 7/01
[52] U.S. Cl. ........................ 348/441; 348/446; 348/453
[58] Field of Search ................................ 348/441, 446, 348/453, 445, 443, 455, 590; 345/154

[56] References Cited

U.S. PATENT DOCUMENTS

| 4,872,054 | 10/1989 | Gray et al. | 348/441 |
|---|---|---|---|
| 4,924,315 | 5/1990 | Yamashita | 358/160 |
| 5,019,904 | 5/1991 | Campbell | 348/446 |
| 5,455,627 | 10/1995 | Eitzmann | 348/441 |
| 5,455,628 | 10/1995 | Bishop | 348/446 |

OTHER PUBLICATIONS

Raytheon Semiconductor, "TMC2360 Video Output Processor" (1994) pp. 1–26.
AITech International, "AIT1108E Video Signal Processor (VSP)," Revision 2.2, pp. 1–10.

Primary Examiner—Victor R. Kostak
Attorney, Agent, or Firm—Douglas J. Crisman; Flehr Hohbach Test Albritton & Herbert LLP

[57] ABSTRACT

A method and system is disclosed for scaling computer video in the process of scan rate conversion. In the disclosed system and method storage is provided for at least two lines of graphics pixels per video component composing the computer graphics signals and less than a full frame's worth of the graphics pixels. The graphics pixels are stored as they are provided so that the newest graphics pixels or a linear combination of the newest graphics pixels and stored graphics pixels overwrite previously-stored graphics pixels. In a repeating pattern for every M television lines, where M>2, television pixels composing the television video signals are generated from a weighted sum of the stored graphics pixels such that a different precomputed set of weights are used to compute the television pixels for each of the M television lines. The television signals are horizontally and vertically scaled so the graphics image corresponding to the computer graphics signals being converted fits within a television display.

14 Claims, 9 Drawing Sheets

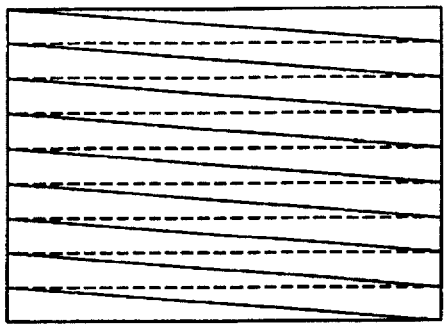
FIG. 1 Non-interlacing Scanning
Solid Lines - Active Scan
Dash Lines - Retrace
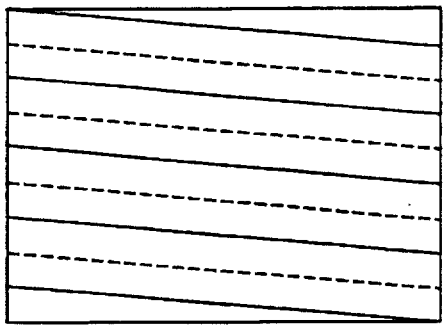
FIG. 2 Interlace Scanning
Solid Lines - Field 1 Scan Lines
Dash Lines - Field 2 Scan Lines
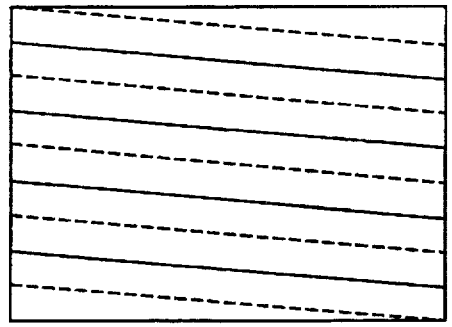
FIG. 3 Interlace Scanning
Solid Lines - Field 2 Scan Lines
Dash Lines - Field 1 Scan Lines
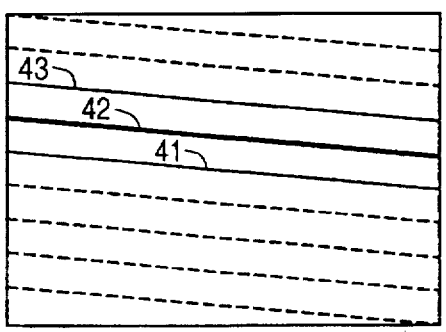
FIG. 4 Three Lines Averaged Together
VGA Input Signal
Lines (1/4)*(n-2)+(1/2)*(n-1)+(1/4)*n
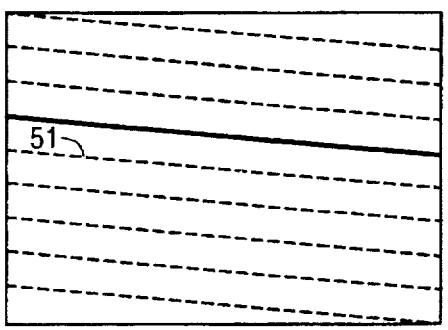
FIG. 5 One Line Produced from Three
TV Output Signal
Line n

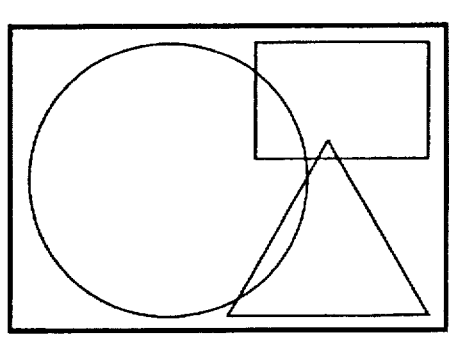
FIG. 6 VGA Image
Underscan of Picture Tube Keeps All
Portions of Picture in Viewable Area
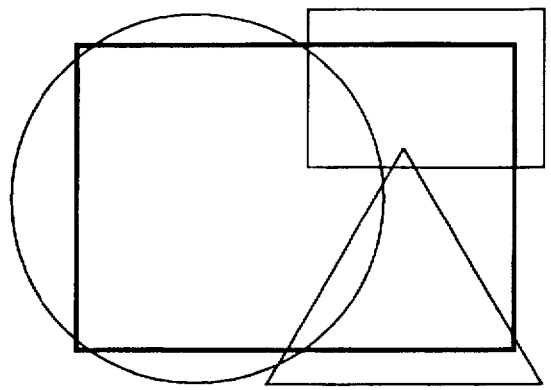
FIG. 7 Image
Underscan of Picture Tube Eliminates
Portions of Picture from Viewable Area
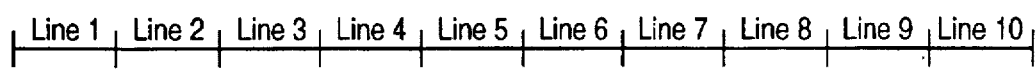
Standard VGA
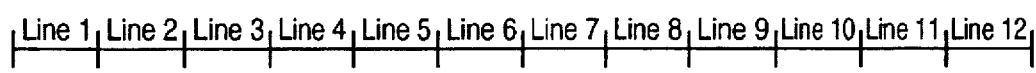
VGA with Increased Pixel Clock (and Horizontal Frequency)
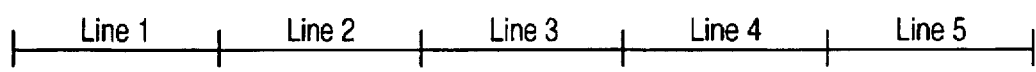
Television Signal after Scan Conversion
FIG. 8 Horizontal Timing Relationships

APPARATUS AND METHOD TO CONVERT COMPUTER GRAPHICS SIGNALS TO TELEVISION VIDEO SIGNALS WITH VERTICAL AND HORIZONTAL SCALING REQUIRING NO FRAME BUFFERS

The present invention relates generally to the conversion of computer video signals to television signals and, particularly, to the conversion of computer video signals to horizontally and vertically-scaled television signals in such a manner that the video signals are converted on the fly and only a small amount of video memory (much less than a frame) is required to perform the conversion.

BACKGROUND OF THE INVENTION

The conversion of computer video signals to video signals compatible with today's televisions has become an important technology for business presentations, home entertainment and the network personal computer (NC). There are three major elements involved in this transformation, color space conversion, scan rate conversion, and encoding the composite waveform in accordance with a selected television signal format (i.e., either NTSC or PAL).

Color space conversion transforms the RGB (Red, Green, Blue) signals output by a VGA source to the YUV (Luminance and Chrominance) signals used to create composite video. This can be performed before or after the scan rate conversion, but must be performed before encoding to a composite television signal.

Encoding to a composite television waveform involves modulation of the color difference signals, generation of synchronization signals, bandlimiting of the luminance and chrominance signals and summation of luminance, chrominance and sync signals.

Scan rate conversion produces a sequence of interlaced lines of video from the non-interlaced sequence of lines generated by the VGA source. In video displays, such as a television or a VGA display, the picture is created by scanning the electron bean horizontally across the screen from left to right, then moving back to the left, and scanning across the screen again. This process is repeated until all lines have been scanned, thus completing one frame of video. The beam also moves down the screen until it reaches the bottom of the display, at which point the beam returns to the top. Referring to FIGS. 1–5, general aspects of the scan rate conversion process are now described.

FIG. 1 shows a non-interlaced scan pattern typical of VGA displays. Because scan rate converters convert VGA signals to television signals, the scan pattern of FIG. 1 illustrates the pattern of VGA lines presented to the scan rate converter. In a non-interlaced VGA display every line is scanned in every frame. At the completion of one scan line, the electron beam travels back to the left side of the screen before the next line can be displayed. This is called retrace. A popular VGA display frame rate (i.e., the rate at which new frames are displayed) is ~60 Hz.

FIGS. 2 and 3 show an interlaced scan pattern typical of a television display. In a television display every other line is scanned in what is called the "first field" (FIG. 2), and the alternate lines are displayed in the "second field" (FIG. 3). Both fields are required to make a complete picture. For NTSC signals, the field rate (i.e., the rate at which new fields are displayed) is ~60 Hz and the frame rate ~30 Hz.

Scan rate conversion must account for the different frame rates of the VGA monitors and television monitors. For example, since a television monitor displays half as many lines as a VGA monitor in a given amount of time, each line of the television signal generated by a scan rate converter must have a duration that is twice that of the VGA signal. Conventional scan rate converters account for the different frame rates by writing the VGA data to memory at one rate and reading television data out of memory at one half of this rate.

In addition to extending the duration of each line, conventional scan rate converters perform a filtering function on adjacent VGA lines. The reason for filtering is to reduce flicker in the television picture caused by picture content transitions (i.e., image edges) in the vertical direction in the VGA signal. For example, if only half of the VGA lines were to appear in a television field, these transitions would appear to move up and down by one line at the frequency of the television frame rate (30 Hz). The flicker filter reduces this movement by spreading a transition over a sequence of television lines. For example, one common flicker filter produces a television line by adding one quarter of the current VGA line, two quarters of the previous VGA line and one quarter of the VGA line before that. This is called a "1-2-1" or a "¼-½-¼" filter. This filtering process increases the memory requirement in the scan rate conversion block. Typically, between one and one half and three VGA lines of memory are required per video component.

FIGS. 4 and 5 illustrate how three VGA lines (FIG. 4) are combined with a 1-2-1 filter to produce a corresponding television line (FIG. 5). The solid lines shown in FIG. 4 are the VGA lines being filtered. The line 41 (FIG. 4) is the current VGA line, corresponding to the television line 51 (FIG. 5) being output. The darker line 42 is the previous VGA line, which is multiplied by the largest weight (i.e., "2"). Both lines 41 and 43 are multiplied by the smallest weight (i.e., "1").

The above-described process of scan rate conversion does not change the location of the image content with respect to the beginning and ending of the electron beam scan in either the horizontal or vertical direction. However, unlike a VGA monitor, a television monitor overscans the picture tube, leaving some of the original image outside of the viewable screen. For example, FIG. 6 shows an image displayed on a VGA monitor and FIG. 7 shows the same image when displayed on a television monitor. Note that a significant portion of the image is not displayed on the television monitor. The amount of this overscan is typically on the order of five to ten percent. With traditional viewing material, where the original source was unknown to the viewer, this is not noticeable. However, when the television is displaying a converted computer display, the missing portions of the screen are noticeable, and sometimes important, areas such as menus.

This problem is addressed by scan rate converters that scale VGA images so that, when displayed on a television monitor, the VGA images fit fully within the television monitor's viewable area. Conventional scaling scan rate converters (such as the Yuan Scan Rate Converter, Model: SFN-100) require the use of a frame buffer/memory large enough to capture an entire graphics frame. After a frame is captured, these conventional converters perform scaling scan rate conversion. This technique requires either a large part count (for implementation using discrete components) and corresponding printed circuit board space, or large amounts of on-chip memory (for monolithic integrated circuit implementation). This leads to high system cost and imposes serious limitations on the potential of high volume applications using conventional scaling scan rate conversion techniques.

SUMMARY OF THE INVENTION

The present invention is an apparatus and method to convert computer graphics signals to television video signals with vertical and horizontal scaling without using a frame buffer.

More particularly, the present invention is a cost effective apparatus and method for scaling computer VGA signals in the process of scan rate conversion. The present invention requires no more than two lines of memory per video component and yields an output signal that is entirely within the viewable area of a television screen. The present method increases the horizontal frequency (i.e., the rate at which video lines are output) and pixel clock (i.e., the rate at which video pixels are provided) of the VGA signals by the inverse of the amount of scaling desired. At the same time, the present method maintains the vertical frequency (i.e., the frame rate) of the video at its usual value. This end is accomplished by inserting additional blank lines into the VGA signal, which requires the present invention to increase the total number of VGA lines by the inverse of the desired scaling factor.

The aforementioned VGA parameters (i.e., horizontal frequency, pixel clock and lines per frame) are programmable in today's VGA controllers. Consequently, the present method can be implemented in a preferred embodiment that determines appropriate values for the VGA parameters and then supplies those values to the VGA controller providing the video signals. The appropriate values depend on the format of the video signals being converted and the required format of the television signals (i.e., NTSC or PAL).

Due to the increase in the VGA horizontal frequency, the preferred embodiment needs to lengthen the output time of each line by a factor of 2 times the inverse of the scaling ratio in order to output a line that is of proper duration for a television. This is done by a combination of changing the readout clock frequency (the clock that determines the rate at which television pixels are provided), and inserting or deleting extra pixels to complete each television line.

For example, a typical scan converter produces five lines of television video in the time it takes a VGA controller to output ten lines of standard VGA video. In contrast, assuming a scale factor of 5/6, the preferred embodiment causes the VGA controller to output twelve lines of VGA video, which are converted by the preferred embodiment to five scaled, scan-converted lines of television video. FIG. 8 shows, from top to bottom, the time-relationships between the 10 lines of standard VGA video, the 12 lines of sped-up VGA video, and the resulting 5 scan-converted lines output by the preferred embodiment.

Note that, for the 5/6 scale factor, and assuming an input image of 640 active pixels by 480 active lines, the total number of television lines containing active video will be 400 (480*(5/6)), and the total number of VGA lines will need to be increased to 630 (525*(6/5)). Scaling the incoming video in this manner generates an output signal whose active video comprises a fewer number of lines than the incoming signal (400 versus 480 in the case of 5/6's scaling). This redistribution of the image across a different number of lines introduces artifacts that where not present in the original image. These artifacts are reduced by modifying the filter used for reducing flicker. This is accomplished by modifying, on a line by line basis, the coefficients used in the flicker filter. For each television line being generated, the surrounding VGA lines are weighted in relation to their distance from the television line. By doing this, the location of objects and transitions in the picture do not move, reducing distortions and artifacts in the image.

FIGS. 9 and 10 show how these flicker filter coefficients are derived for the case of 5/6's and 7/8's scaling. Each television line shown spans three (four in one case) VGA lines. For example, for the case of 5/6's scaling, shown in FIG. 9, the television line 3 spans parts of VGA lines 5–8. The taps of the flicker filter (shown between VGA and television lines) are chosen to match the percentage that a particular television line overlaps a particular VGA line. In the case of 7/8's scaling, shown in FIG. 10, the filter coefficients are changed for each of the seven television lines produced by sixteen VGA lines. This pattern is repeated for every group of VGA lines. I.e., for 5/6 scaling, every 12 VGA lines and, for 7/8 scaling, every 16 VGA lines.

To maintain the resulting television image in a proper aspect ratio, the horizontal size of the image needs to be reduced by the same amount as the vertical size. The preferred embodiment accomplishes this by first determining a memory read clock of the appropriate frequency. This is found by dividing the total number of active pixels by the standard (different for NTSC and PAL) active line time multiplied by the scale factor (Active Pixels/(Standard Active Line Time*(Scale Factor))). Once the appropriate frequency is determined, the total number of pixels to be output per television line can be determined by dividing that clock frequency by the desired (different for NTSC and PAL) horizontal scan rate.

BRIEF DESCRIPTION OF THE DRAWINGS

Additional objects and features of the invention will be more readily apparent from the following detailed description and appended claims when taken in conjunction with the drawings, in which:

FIG. 1 shows a non-interlaced scan pattern typical of VGA displays;

FIG. 2 shows the scan lines of the first field of an interlaced scan pattern typical of a television display;

FIG. 3 shows the scan lines of the second field of an interlaced scan pattern typical of a television display;

FIG. 4 illustrates three VGA lines combined with a 1-2-1 filter to produce a corresponding television line;

FIG. 5 shows the television line generated from the three VGA lines of FIG. 4;

FIG. 6 shows an image displayed on a VGA monitor;

FIG. 7 shows the image of FIG. 6 when displayed on a television monitor;

FIG. 8 shows, from top to bottom, the time-relationships between the 10 lines of standard VGA video, the 12 lines of sped-up VGA video, and the resulting 5 scan-converted lines output by the preferred embodiment;

DESCRIPTION OF THE PREFERRED EMBODIMENT

Figure 9:
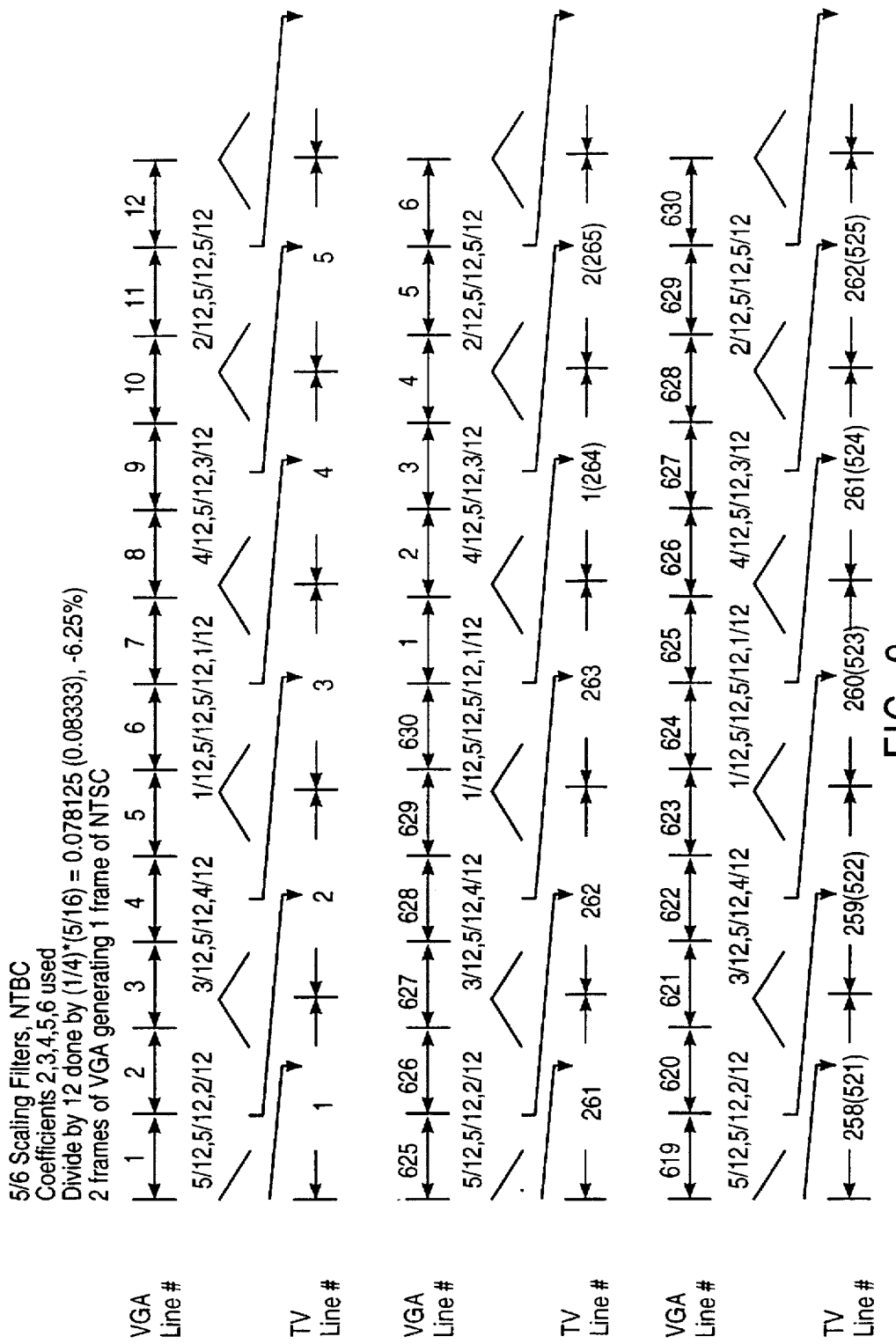
FIG. 9 is a table illustrating the derivation of the flicker filter coefficients for the case of 5/6's scaling.
Figure 10:
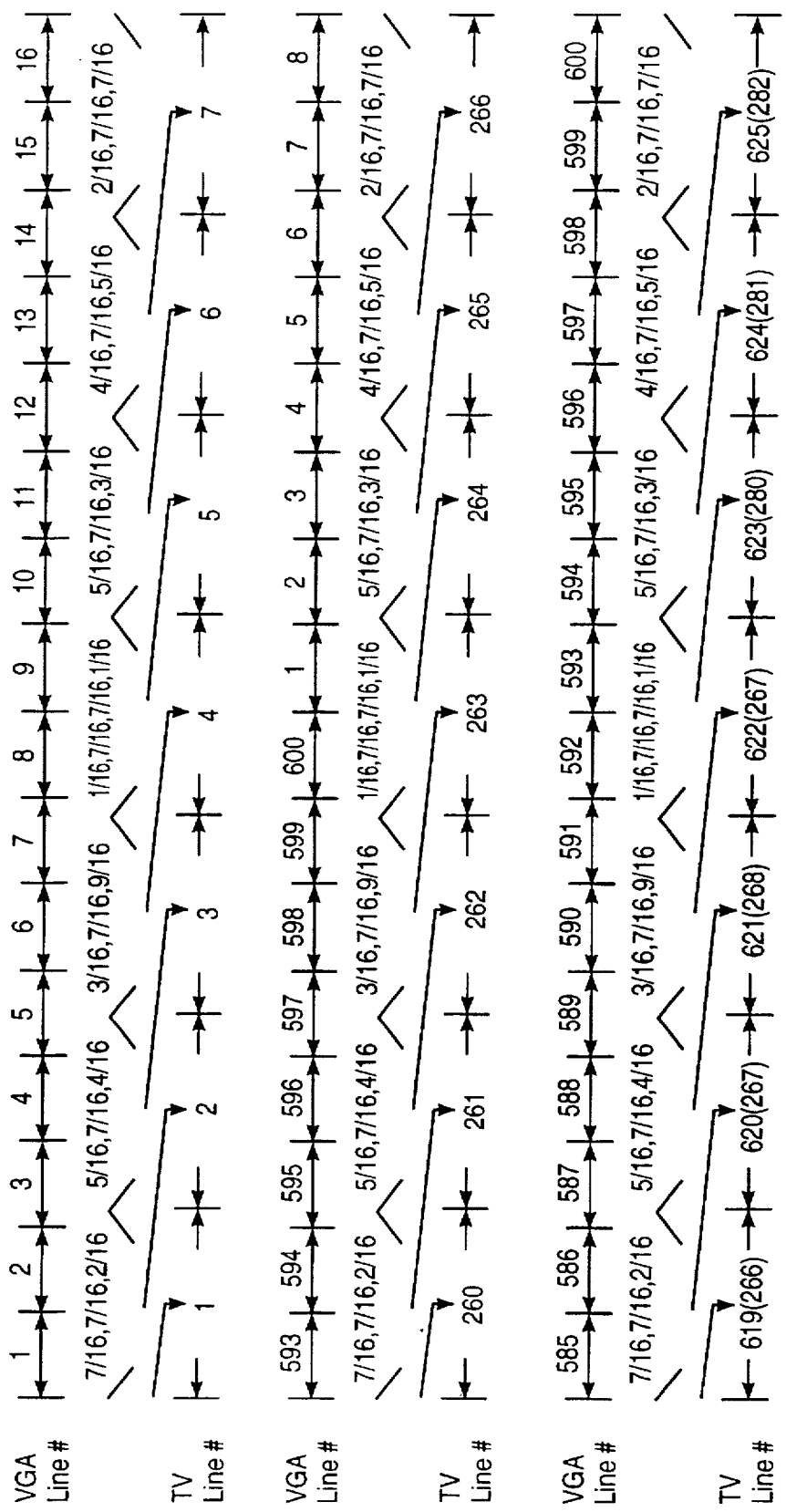
FIG. 10 is a table illustrating the derivation of the flicker filter coefficients for the case of 7/8's scaling.
Figure 11:
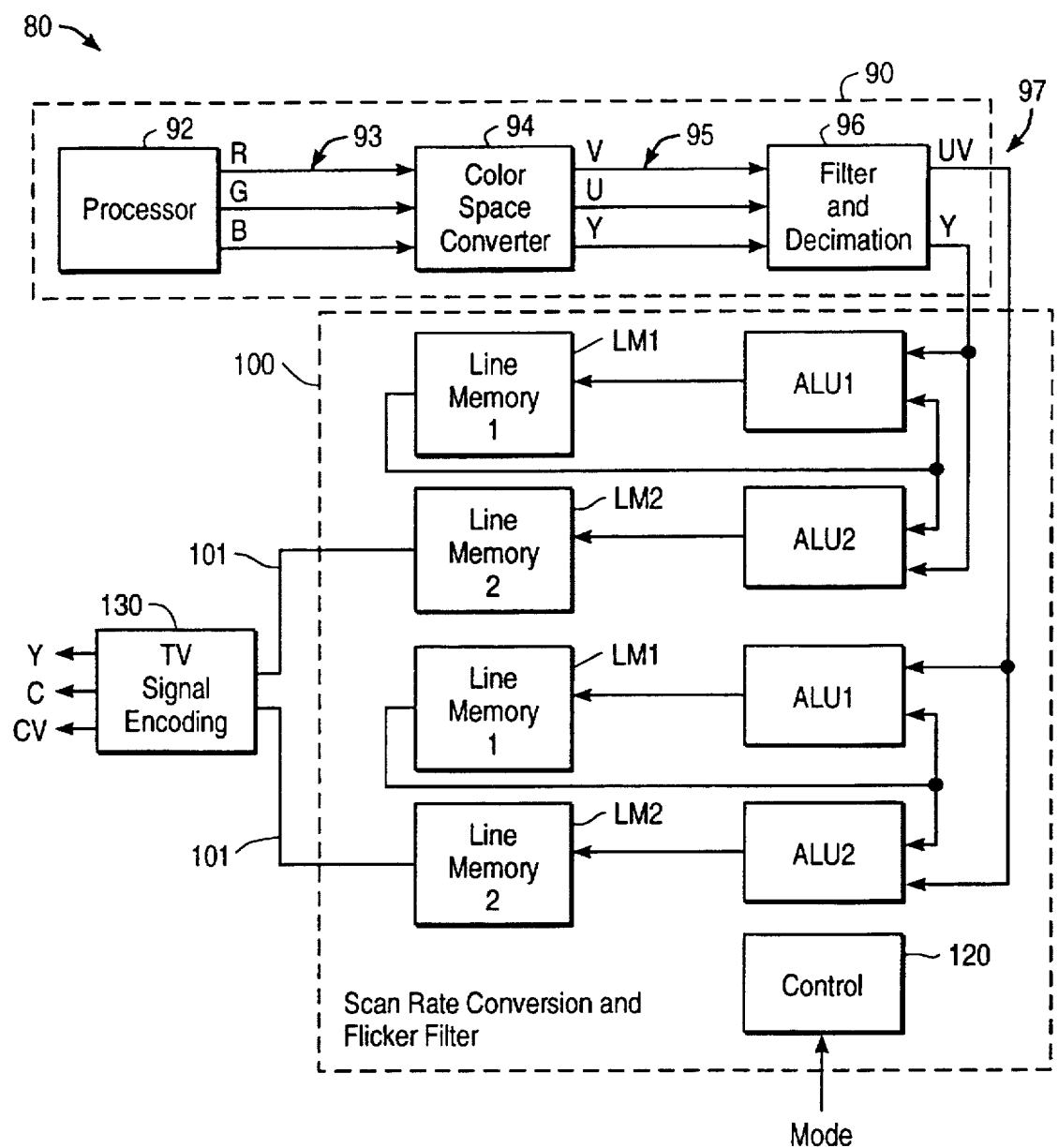
FIG. 11 is a block diagram of a system for converting a computer graphics image into a scaled television image in accordance with the present invention.

Referring to FIG. 11, there is shown a block diagram of a system 80 for converting a computer graphics image into a scaled television image in accordance with the present invention. A graphics processor 92 included within a VGA controller 90 first generates an image 93. The image 93 has a specified number of lines per frame (GLPF), active lines (GLPFA), pixels per line (GPPL) and active pixels per line (GPPLA). The horizontal frequency (GHF) of the image 93 is determined by the pixel frequency (GPF) divided by the GPPL and the vertical frequency, or frame rate, of the image 93 is determined by the horizontal frequency (GHF) divided by the GLPF.

A color space converter 94 transforms the RGB representation of the image 93 to the YUV domain 95. The YUV domain is preferred for television signals because the color component of the final television signal (which is derived from U and V) has a lower bandwidth than the Y component. Therefore, the data rate of the U and V signals can be reduced and these two signals can share one memory bank.

Figure 15:
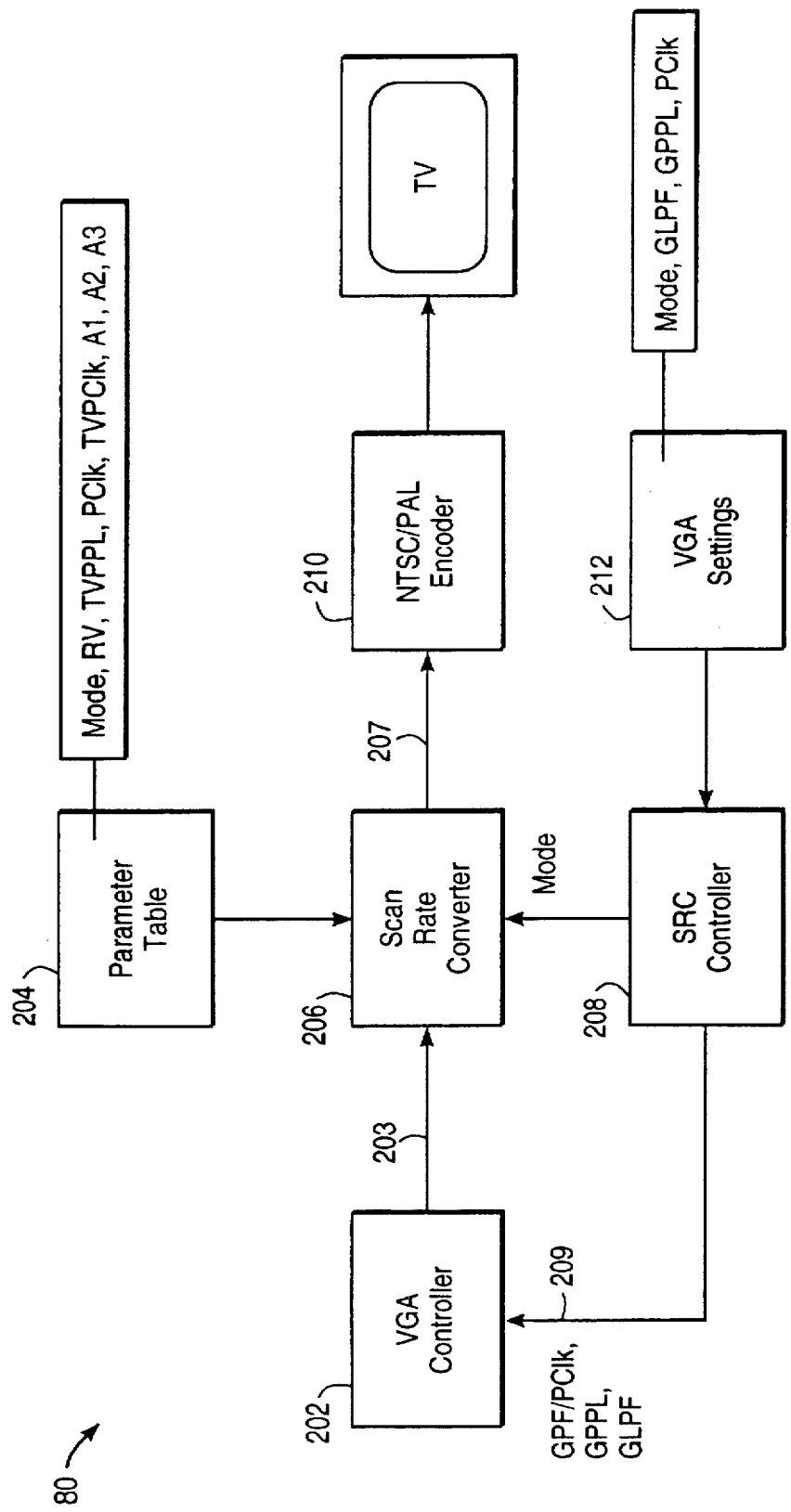
FIG. 15 is a block diagram of a preferred embodiment that determines the signal parameters associated with various operational modes using table lookup techniques.

A filter and decimation block 96 performs data rate reduction and multiplexing on the YUV data 95 output by the color space converter 94. The block 96 outputs two signals 97, a Y signal and a multiplexed, decimated UV signal. The signals 97 are processed in the scan rate conversion and flicker filter block 100, which includes two programmable adders ALU1, ALU2 and two line memories LM1, LM2 for each data channel (i.e., for the Y and UV signals). In the preferred embodiment, the line memories LM1, LM2 together store no more than 2*GPPL pixels. For example, all GPPL graphics pixels, or only the GPPLA active graphics pixels, can be stored for each line of video. More generally, the teachings of the present invention are applicable to line memories that store less than one frame of computer video signals. The scan rate conversion (SRC) block 100 also includes a control section 120 that generates addresses for the line memories and sets operational parameters for the SRC block 100 in accordance with a "mode" supplied by an external SRC Controller (FIG. 15).

Among other things, the mode input to the controller 120 is associated with a scale factor to be applied to the graphics signals 97. Different scale factors, including no (or 1:1) scaling, are implemented to accommodate different combinations of image format and television formats. The various modes are described below in reference to Appendices A and B.

Figure 12:
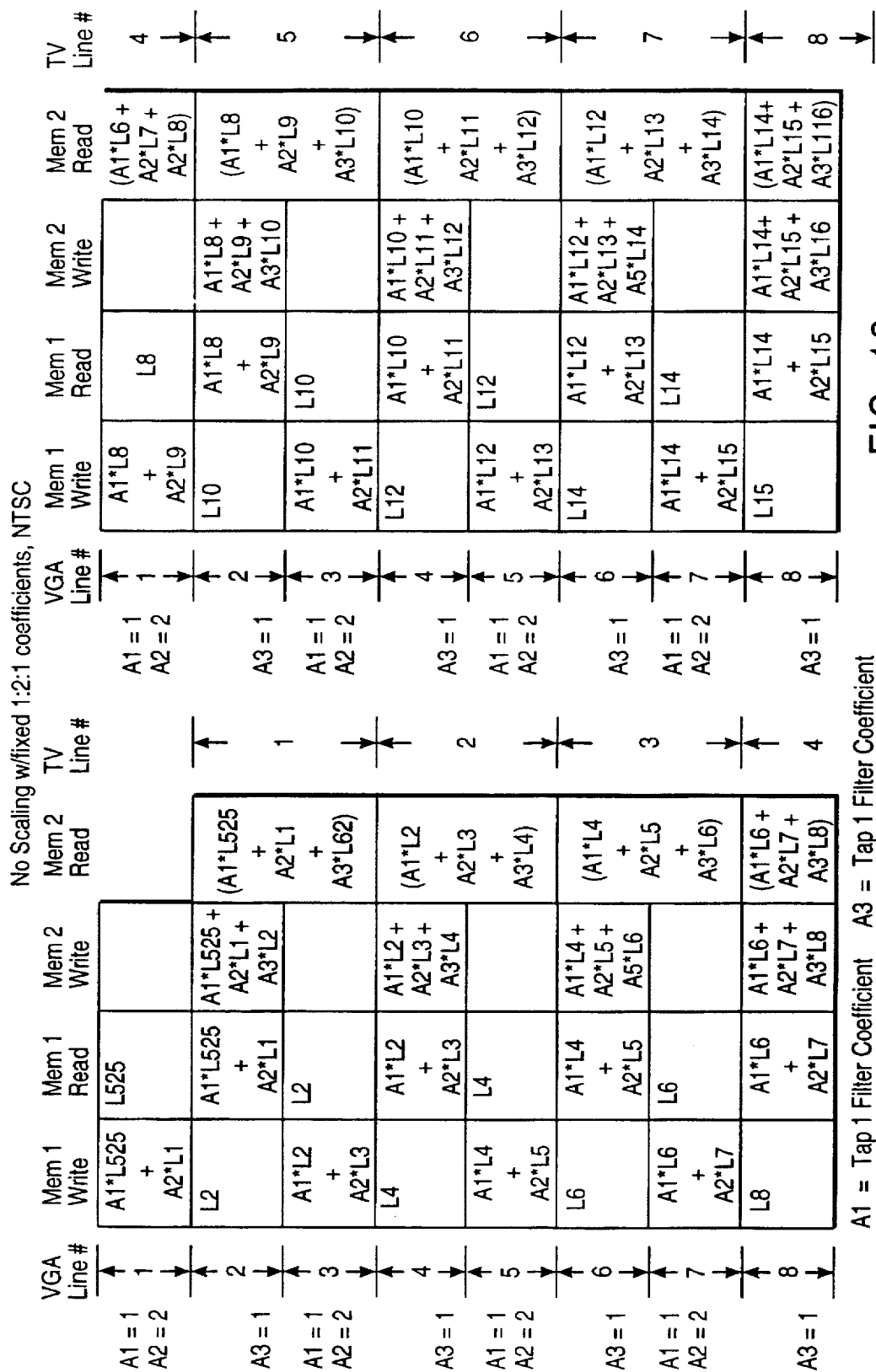
FIG. 12 illustrates the sequence of operations by which the scan rate conversion block of FIG. 11 generates a TV line for every two graphics lines for the no scaling modes.

When no scaling is required, the scan rate conversion block 100 processes every two graphics lines according to a sequence that is illustrated in FIG. 12. This figure shows the values of the filter coefficients (i.e., A1, A2, A3) applied to a set of three graphics lines to generate a corresponding television line. In particular, FIG. 12 is directed to the conversion of a VGA image to a 525 line (NTSC) image without scaling. At least one of the filter coefficients is updated for each incoming graphics line. The values of the filter coefficients updated for a given graphics line are shown to the left of the line number in the "VGA Line #" column. For example, the A3 coefficient is set to "1" for the VGA line 2 and the A1 and A2 coefficients are respectively set to 1 and 2 for the VGA line 3. The television line being generated is shown in the right-hand "TV Line #" column. The LM1 and LM2 and ALU1 and ALU2 operations used to generate a TV line are shown for the relevant set of VGA lines. The sequence of reads, writes and ALU operations used in the scan rate converter block 100 to generate the unscaled TV line 1 is now described in reference to FIG. 12.

When the first line in the two line sequence consisting of the VGA lines 2 and 3 is received by the scan rate conversion block 100, a weighted sum of the two previous lines (i.e., A1*L525+A2*L1) is already stored in the line memory LM1. The VGA line 2 is added in the ALU2, with scale factor A3, to that weighted sum and the resulting sum (A1*L525+A2*L1+A3*L2) is written to the line memory LM2. The first line data (L2) is then stored in the line memory LM1, overwriting the currently stored data. These memory and ALU operations occur at the pixel rate of the graphics processor, indicated in FIG. 12 by the coincidence of the VGA line boundaries with the "Mem 1 Write", "Mem 1 Read" and "Mem 2 Write" operations. As the sum (A1*L525+A2*L1+A3*L2) is being written to the line memory LM2, the sum is also being read out of the line memory LM2 as the television line 1. However, the line memory LM2 read address pointer is incremented at one half the rate of the line memory LM2 write address pointer, causing the output line to take twice the time of the input line. This is required as a television line has roughly twice the duration of a VGA line. During the second line (i.e., line 3) of the two line sequence, the data from the line memory LM1 (L2) is read, scaled by the factor A1, and added in the ALU1 to the incoming line (L3) scaled by A2. This sum (A1*L2+A2*L3) is then written back into the line memory LM1 to be used to generate the next television line. This process continues through all the lines of the image.

Figure 13:
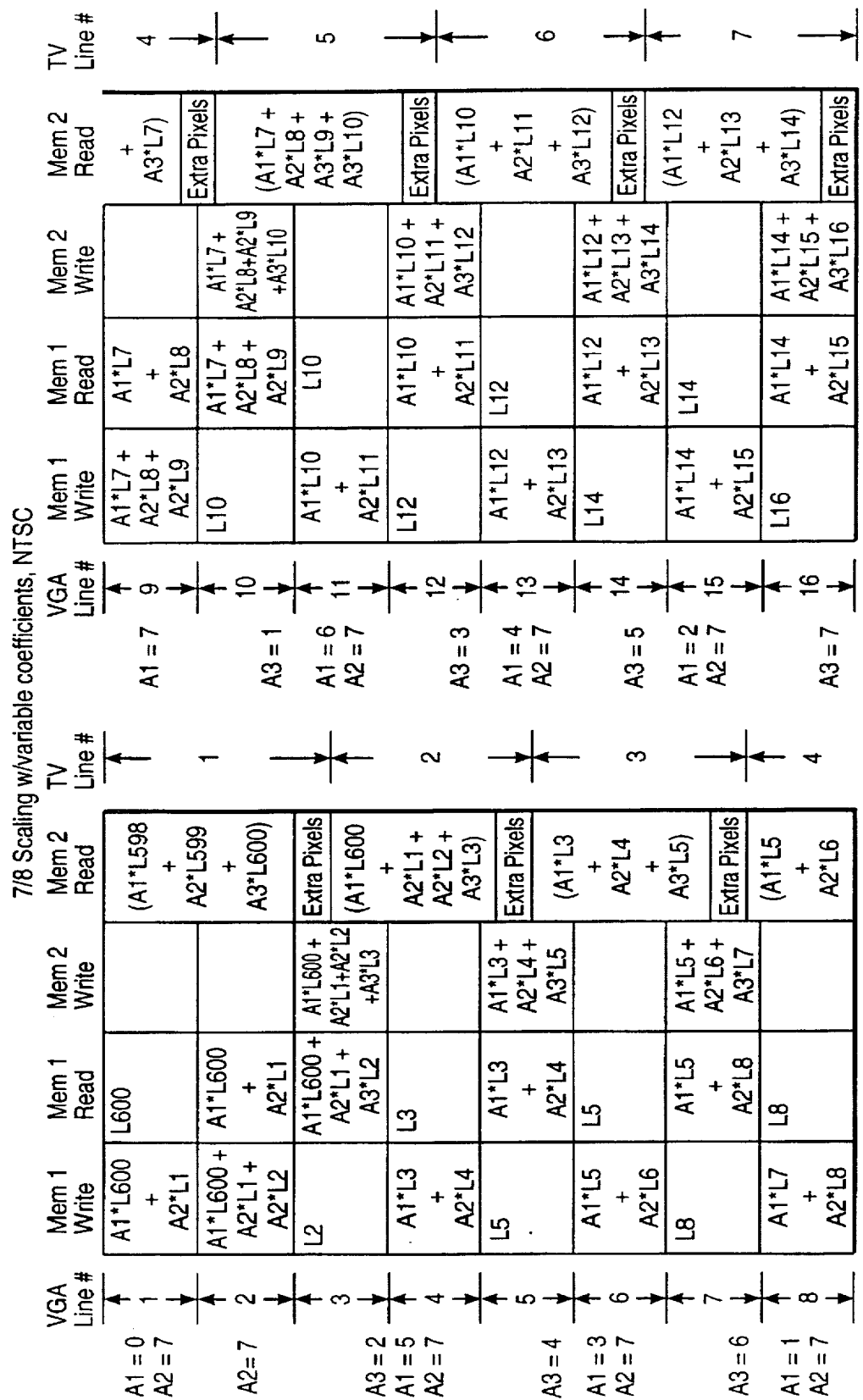
FIG. 13 illustrates the sequence of operations by which the scan rate conversion block of FIG. 11 generates a TV line from three or four graphics lines for the scaling modes.

The operation of the scan rate conversion block when scaling is required repeats a sequence over a number of graphics lines equal to two times the denominator of the scaling ratio. One possible scaling ratio is 7/8 (corresponding to a repetition of the sequence over 16 VGA lines), for which the pattern of memory and ALU operations is illustrated in FIG. 13. The major difference between the non-scaling and scaling modes of operation is that, for scaling modes, alternate lines are not always scaled by the coefficient A2 and combined with the current contents of the line memory LM1. This is due to the fact that in the scaling modes an odd number of television lines is generated from an even number of VGA lines (e.g., 7 TV lines are generated from 16 VGA lines in the 7/8 scaling mode). As a result, all but two of the television lines generated in one period of the repeating sequence are generated from three VGA lines in the manner used for the non-scaling case. The other two television lines are generated from four VGA lines. For example, in the 7/8 scaling operation shown in FIG. 13, the TV lines 1, 3, 4, 6 and 7 are generated in the usual way from three VGA lines. The TV lines 2 and 5 are generated from four VGA lines. In the scaling modes, once the pixels from the VGA lines are used to generate a particular TV line, extra (blank) pixels are output to provide TV lines at the correct horizontal rate.

In the case where the TV line is formed from four VGA lines, two successive incoming lines are scaled and added to the contents of the line memory LM1. Then, during the next line this data (now a combination of three lines) is combined with the incoming line and written to the line memory LM1. For example, TV Line 5 (FIG. 13) is formed from the VGA lines 7, 8, 9 and 10 according to the expression: A1*L7+A2*L8+A2*L9+A3*L10. This allows time for reading data out of the line memory LM2 at a rate slower than one half the write data rate and for inserting extra (blank) pixels into each television line. The combination of these two operations allows the present invention to correct the horizontal rate and process all active graphics lines (GLPFA) in a reduced number of television lines.

Figure 14:
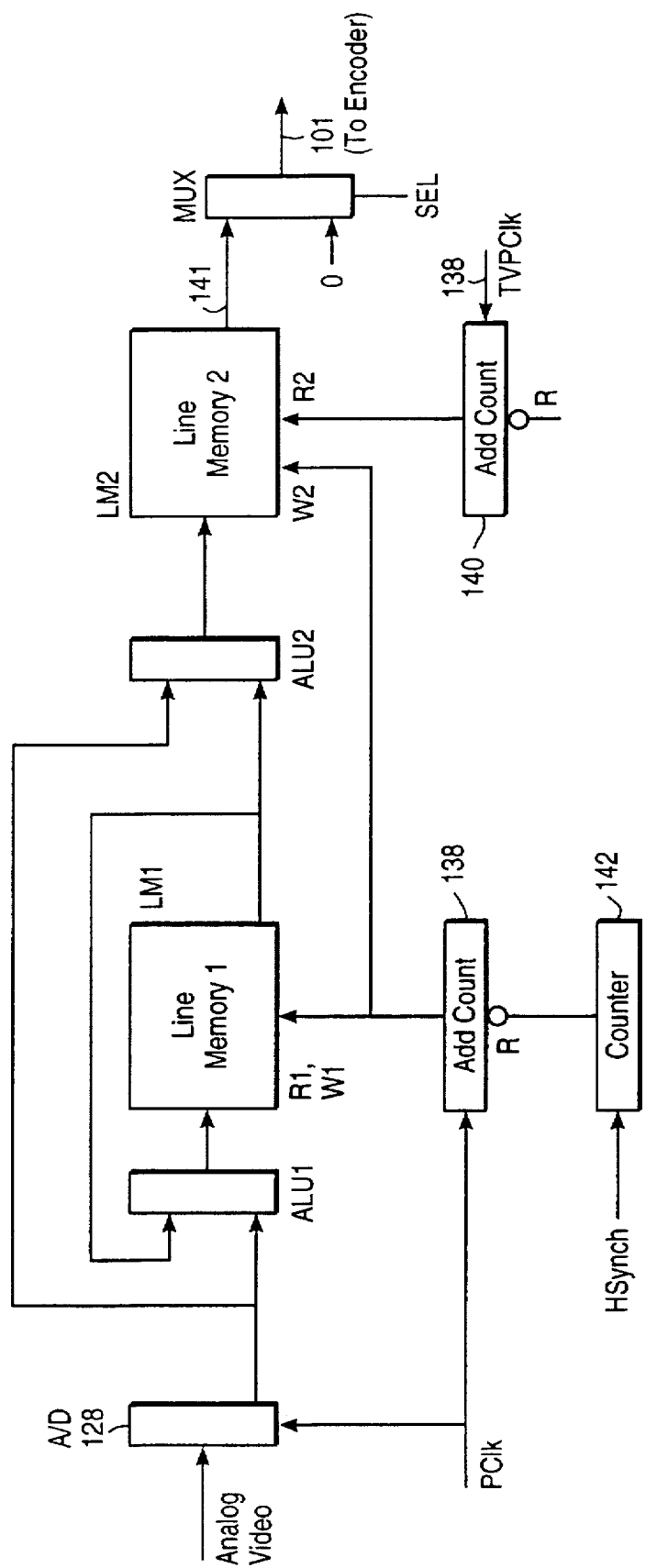
FIG. 14 is a block diagram illustrating additional details of a preferred embodiment of portions of the scan converter circuitry of FIG. 11.

Referring to FIG. 14, there is shown a block diagram illustrating additional details of a preferred embodiment of portions of the scan converter circuitry 100. The circuitry shown in FIG. 14 is duplicated for each of the two data channels (i.e., the Y and the UV signals). An analog to digital converter (A/D) 128 coupled to one of the data channels reads out analog pixel data at a rate determined by a pixel clock PClk. The digital data from the AND 128 is coupled to one input of the ALU1. The ALU1 output is coupled to the line memory LM1, whose output is, in turn, fed back to the other ALU1 input and to one input of the ALU2. The ALU1 output is stored at an address W1 supplied by the address counter 138, which increments the W1 addresses at the rate of the pixel clock PClk. The address counter also provides an address R1 of data to be read out from line memory LM1. The address R1 is 2-3 pixel clocks ahead of the write address W1 due to the processing delay of the ALU1, which enables each pixel representing a particular location in the video line to be written to the same memory location. The address counter 138 is reset by a horizontal synch signal HSynch that is asserted at the beginning of each VGA line. The PClk and HSynch signals are generated by the controller 120 (FIG. 11).

The A/D 128 output is also provided to the other input of the ALU2, whose output is stored by the line memory LM2 at a write address W2 that is the same as the W1 address provided by the address counter 138. Consequently, the line memory LM1 reads and writes and the line memory LM2 writes all occur at the pixel clock PClk frequency. Active television signal data 101 is output from the line memory LM2 from an address R2 that is incremented by the address counter 140 at the rate of the television pixel clock TVPClk. The frequency of the TVPClk is set according to the expression: (active pixels/(the standard active line time*the scale factor)). This value is then adjusted so that the number of pixels per line satisfies equation (4), discussed later. The address counter 140 resets itself after the TVPClk reaches TVPPL (TV pixels per line setting). The TVPClk is generated by the controller 120.

The active television signal data 141 from the line memory LM2 is coupled to one input of a multiplexer (MUX) whose other input is tied to a "0" input. The MUX is responsive to a select signal (SEL) that selects the active television signal data 141 when the pixel count for the current line has not exceeded GPPL (indicating there are more graphics pixels to be converted) and selects the "0" input whenever the pixel count for the current line is between GPPL and TVPPL. This enables the MUX to generate active television pixels when appropriate and blank television pixels as needed to fill out the current TV line and satisfy the required television horizontal frequency (TVHF). The MUX output 101 is provided to the TV signal encoder 130 (FIG. 11).

The address counters 138 and 140 are synchronous with a period of M lines, where M is equal to the number of VGA lines over which the filtering sequence is performed. For example, M is equal to 12 for 5/6 scaling and is equal to 16 for 7/8 scaling.

The operations of the ALUs are controlled by signals from the controller 120 that are not shown in FIG. 14. For example, for the first VGA line of a sequence of VGA lines, the ALU2 is caused to combine the output from the A/D converter 128 and the contents of address R1 of the line memory LM1. This weighted sum is then stored at address W2 of the line memory LM2. For the same line, once the line memory LM1 read has been performed, the ALU1 is caused to simply pass VGA line 1 signals to the line memory LM1 to be stored at the W1 address, where they overwrite pixel data from the previous line. For the second VGA line of a sequence, the ALU1 is caused to combine the contents of the line memory LM1 at the new pixel address R1 with the current weighted output from the A/D 128. The new sum is then written to address W1 in the line memory LM1. No ALU2 or line memory LM2 write operations are performed for the second line of the sequence. This enables the contents of the line memory LM2 to be read out at the slower rate defined by the TVClk.

Referring again to FIG. 11, the output 101 of the scan conversion and flicker filtering block 100 is applied to the TV Signal Encoding block 130. This block filters the inputs, modulates the U and V components and generates the Y, C and CV (composite video) outputs required by a television.

The preferred embodiment supports many different computer graphics and television formats. For example, the preferred embodiment can generate PAL or NTSC television signals from VGA images with 640×480 or 800×600 pixel resolutions. To accommodate the different combinations of formats and different desired television image sizes, the preferred embodiment provides a wide-range of scaling factors, including 1:1 (no scaling), 7:8, 5:6 and 3:4. Each different supported combination of scaling factor, television format (output) and computer graphics format (input) is defined as a selectable user mode. Once a user selects a mode of operation, the preferred embodiment determines parameters of the VGA and television signals consistent with that mode. This parameter determination can be performed in the scan rate conversion block 100 by table lookup or by direct calculation.

Referring to Appendices A and B, there are shown two tables that list some of the VGA and television signal characteristics associated with operational modes supported in various preferred embodiments of the present invention. These signal characteristics include: the number of VGA lines per frame (GLPF); the number of VGA pixels per line (GPPL); the VGA horizontal frequency (GHF); the VGA pixel frequency (GPF); the A/D clock frequency (PClk); the D/A clock frequency (TVPClk); the number of television lines per frame (TVLPF), the number of TV pixels per TV line (TVPPL); over/underscan percentage of the resulting scaled image when displayed on a television monitor (overscan is positive, underscan is negative); and aspect ratio of the final image (expressed as a horizontal/vertical ratio). Appendix A is directed to a set of six modes (0-3, 5-6) that are implemented in the Chrontel model CH7002 VGA to NTSC scaling scan rate converter. Appendix B is directed to a hypothetical set of modes that could be supported in an alternative preferred embodiment. The possible settings are not limited to those illustrated in either Appendix A or B.

How these modes are implemented is now described in reference to FIG. 15, which shows a preferred embodiment that determines the various signal parameters using table lookup techniques.

Referring to FIG. 15, the VGA controller 202 outputs video signals 203 representing an image to be scan-rate converted and scaled. Characteristics of the signals 203 are set by the VGA controller 202 in response to control inputs 209 from an external scan-rate converter (SRC) controller 208. These control inputs 209, which the SRC controller 208 establishes depending on the selected mode, include at least the number of lines per frame (GLPF), pixels per line (GPPL) and pixel clock rate (Pclk) (or graphics pixel frequency GPF) to be used to generate the video signals 203. A group of these parameters is stored for each supported mode in a VGA settings table 212 that can be accessed by the SRC controller 208. Given these parameters, the VGA Controller can determine other graphics parameters, such as the horizontal frequency (GHF) and frame rate (GFR). An example of the VGA settings table 212 is provided in Table 1, below.

TABLE 1

VGA Settings Table

| Mode | Graphics Lines per Frame (GLPF) | Graphics Pixels per Line (GPPL) | Pixel Clock (MHz) (PClk) |
|---|---|---|---|
| 0 | 750 | 944 | 35.400 |
| 1 & 4 | 625 | 800 | 25.000 |
| 2 | 525 | 800 | 25.1748 |
| 3 | 600 | 784 | 28.1958 |
| 5 | 625 | 944 | 29.500 |
| 6 | 700 | 1040 | 43.6364 |

In addition to setting the VGA controller parameters, the SRC controller 208 passes the selected mode to the scan rate converter 206. The scan rate converter 206 determines the television signal parameters by performing a lookup into the parameter table 224, which stores basic television signal parameters required for each mode. The basic parameters include: scaling routine periodic rate (the number of VGA lines over which the scaling routine is repeated), also called the repeat value (RV); total pixels per television line (TVPPL); line memories LM1 and LM2 write clock and line memory LM1 read clock (PClk); line memory LM2 read clock (TVPClk); and values for the flicker coefficients: A1; A2 and A3.

An exemplary parameter table 204 is shown in Table 2. The modes shown in Tables 1 and 2 are the same. This enables the necessary coordination between the VGA controller 202 and the scan rate converter 208.

only for VGA lines 1, 4, 6, 8, 10, 13 and 15. Consequently, Table 2 shows seven A1 coefficient values, corresponding to the aforementioned VGA lines. Similarly, Table 2 shows 9 values for the A2 coefficient, corresponding to the 9 times the A2 coefficient is set by the preferred embodiment in the 16 VGA lines used to generate the 7 television lines in mode 3 operations. The bracketed filter coefficients in Table 2 designate occurrences in which two consecutive VGA lines are scaled by the coefficient A2 and averaged with the line memory LM1 contents.

Having described the architecture of a preferred embodiment, the method by which the video and television parameters associated with a particular operational mode are determined is now described.

Equations relating input and output signals

In the preferred embodiment, the television signal clock (TVClk) rate is not decoupled from the graphics signal (PClk) clock rate. This is what enables the present invention to avoid the frame buffer required by the prior art. However, this coupling between the TVClk and the PClk dictates a need for a set of methods/guidelines to determine graphics signal parameters (i.e., GLPF, GPPL, PClk) and scaling factors that enable systems implemented in accordance with the present invention to convert computer graphics signals to scaled television signals on-the-fly.

The first issue to be resolved when determining the signal parameters is the scale factor (K) to be used. The scale factor K can be represented as by the ratio M/N, where M and N are integers corresponding, respectively, to the M television lines to which the present invention must scale 2*N graphics lines. For example, in mode 3, the scan rate converter converts 16 VGA lines into 7 television lines. Alternatively, designating the number of television lines per frame as TVLPF (which can be 525 for NTSC and 625 for PAL), the

TABLE 2

Parameter Table

| | Mode | | | | | |
|---|---|---|---|---|---|---|
| | 0 | 1 | 2 & 4 | 3 | 5 | 6 |
| RV | 12 | 2 | 2 | 16 | 2 | 8 |
| TVPPL | 1920 | 1800 | 1600 | 1792 | 1600 | 1600 |
| LM1,LM2 WClk; LM1 RClk | 800 × GHF | 800 × GHF | 800 × GHF | 784 × GHF | 800 × GHF | 800 × GHF |
| LM2 RClk | 800 × GHF | (9/8)800 × GHF | 800 × GHF | 784 × GHF | 800 × GHF | (3/4)800 × GHF |
| A1 Values | 0,1,2,4,2 | 1/3 or 1/4 or 1/5 | 1/3 or 1/4 or 1/5 | 0,5,3,1, 6,4,2 | 1/3 or 1/4 or 1/5 | 0,1,2 |
| A2 Values | [5,5],5, [5,5],5,5 | 1/3 or 2/4 or 3/5 | 1/3 or 2/4 or 3/5 | [7,7], 7,7,[7,7] 7,7,7 | 1/3 or 2/4 or 3/5 | [3,3],[3,3], 3 |
| A3 Values | 2,4,1,3, 5 | 1/3 or 1/4 or 1/5 | 1/3 or 1/4 or 1/5 | 2,4,6,1, 3,5,7 | 1/3 or 1/4 or 1/5 | 2,1,3 |

For the 1:1 scaling modes (i.e., modes 1, 2, 4 and 5) shown in Table 2, the user can select from three sets of filter coefficients: (1/3, 1/3, 1/3), (1/4, 1/2, 1/4), or (1/5, 3/5, 1/5). For the other modes, where scaling is performed, note that the number of filter coefficient values shown is not the same as the number of VGA lines over which the filter sequence is performed. This is because respective filter coefficients are not adjusted for each VGA line. For example, referring to FIG. 13, which corresponds to mode 3 (7/8 scaling, 640×480 input image, NTSC output), the A1 coefficient is updated number of graphics lines per frame (GLPF) can be represented as: GLPF=TVLPF/K, where GLPF is an integer. Given that TVLPF and GLPF are integers, it must be the case that equation 1, shown below, must produce an integer.

$$\frac{TVLPF}{K} = TVLPF \times \frac{N}{M}$$ Eq. (1)

Typically, b 1<N/M<2; consequently, the relationship shown in equation 2 must also produce an integer.

$$\frac{TVLPF}{M} = \text{integer} \qquad \text{Eq. (2)}$$

Thus, because 525 is divisible by 3, 5, and 7, the scale factors K of 3/4, 5/6 and 7/8's are possible for NTSC television monitors (recall that NTSC uses 525 television lines). Other scale factors, such as 15/16 and 21/30 etc., are also possible but provide either too much or too little scaling.

Because 625 is only divisible by 5 it appears that K=5/6 is the only possible scale factor for PAL television monitors. However, other scale factors K can be implemented by changing the total number of television lines to something other than 625. For instance, 7/8's scaling can be used to produce a television signal of 623 lines (712 graphics lines). Televisions supporting PAL signals will be able to lock to this number of lines and, as long as the number of television lines remains an odd number, the interlace of the television will be maintained.

Having determined the scale factor, the graphics horizontal frequency (GHF) can be determined according to equation 3.

$$GHF = \frac{(2 \times TVHF)}{K} \qquad \text{Eq. (3)}$$

In this equation, TVHF designates the horizontal frequency of the television signal, the factor of two comes from the non-interlaced nature of the graphics signal and the division by the scale factor K corresponds to need to speed up the graphics signal so that the total number of active graphics lines will occur in a shorter period of time, covering fewer television lines.

Having determined the GHF, the number of graphics pixels per line (GPPL), and television pixels per line (TVPPL) can be determined as follows.

In systems where a single phase locked loop (PLL) is employed to generate the television signals, data is read from the line memory LM2 at one half the rate it is written into it. In such systems, the number of television pixels per line (TVPPL) times the number of television lines per frame (TVLPF) must equal the number of graphics pixels (GPPL) times the number of graphics lines (GLPF). Since the number of lines for both graphics and television have already been established, GPPL and TVPPL can be determined according to either equation 4 or equation 5.

$$\frac{TVPPL \times TVLPF}{GLPF} = \text{integer} = GPPL \qquad \text{Eq. (4)}$$

$$\frac{GPPL \times GLPF}{TVLPF} = \text{integer} = TVPPL \qquad \text{Eq. (5)}$$

Any values of graphics pixels per line (GPPL) and television pixels per line (TVPPL) that satisfy these equations can be used. However, for many graphics processors the number of graphics pixels per line (GPPL) must be a multiple of eight. Additionally, the total number of graphics pixels per line (GPPL) should be chosen such that the percentage of underscan achieved in the horizontal direction matches the percentage of underscan in the vertical direction.

For example, where the number of television nominal active lines per frame is designated as TVNLPFA (which equals 480 for NTSC and 575 for PAL), the vertical underscan (VU) of the television image can be determined according to equation 6.

$$VU = \frac{GLPFA \times K - TVNLPFA}{TVNLPFA} \times 100 \qquad \text{Eq. (6)}$$

Designating the television nominal horizontal active time as TVNHAT, then the horizontal underscan (HU) of the television image can be determined according to equation 7.

$$HU = \frac{\frac{2 \times GPPLA}{GPPL \times GHF} - TVNHAT}{TVNHAT} \times 100 \qquad \text{Eq. (7)}$$

Therefore, for a given mode, the total number of graphics pixels per line (GPPL) should be chosen in order to match HU and VU and satisfy equation 4. The graphics pixel frequency (PClk) can then be determined by multiplying the graphics horizontal frequency (GHF) by the graphics pixels per line (GPPL) as in equation 7.

In systems where a dual PLL is employed, and data is read from the line memory LM2 at some frequency other than one half the rate it is written into it, the following relationship must hold true. In this case, assume that the line memory LM2 read frequency is ½*(P/Q) times the line memory LM2 write frequency, where P and Q are defined to be the ratio of the frequencies of the two PLL's used in a dual PLL system. The ratio P/Q is proportional to the ratio TVPPL/GPPL. An alternative way of defining P and Q is that the LM2 read clock is P times the graphics horizontal rate (GHF), whereas the LM1 read and write clocks and the LM2 write clock are Q times the GHF.

Consequently, the number of television pixels (TVPPL) times television lines (TVLPF) must equal (P/Q) times the number of graphics pixels (GPPL) times the number of graphics lines (GLPF). The proper selection of these two frequencies can aid in maintaining proper aspect ratio. Assuming the number of lines for both graphics and television are known, GPPL and TVPPL can be determined according to either equation 8 or equation 9.

$$\frac{TVPPL \times TVLPF}{(P/Q) \times GLPF} = \text{integer} = GPPL \qquad \text{Eq. (8)}$$

$$\frac{(P/Q) \times GPPL \times GLPF}{TVLPF} = \text{integer} = TVPPL \qquad \text{Eq. (9)}$$

The vertical underscan for the dual PLL case is again determined according to equation 6 and the horizontal underscan is determined according to equation 10, below.

$$HU = \frac{\frac{2 \times GPPLA}{(P/Q) \times GPPL \times GHF} - TVNHAT}{TVNHAT} \times 100 \qquad \text{Eq. (10)}$$

Examples of the VGA and television parameters computed according to these guidelines are shown in Appendices A and B. Using these equations, many other modes can be devised with different scaling factors and VGA and television signal characteristics.

In summary the present invention provides the following advantages over the prior art scan rate conversion systems:

scaling of VGA image in horizontal and vertical directions making entire image visible on a television monitor without the use of a frame buffer;

scaling filter with variable filter coefficients implements both flicker filter and scaling artifact reduction;

reduced memory requirement through manipulation of incoming graphics signal, and unique scan conversion memory control (i.e., no more than two line memories per video component);

scaled image maintains vertical frequency of source image, corrects horizontal frequency to television standard;

a set of equations determining the graphics processor output signal have been developed. These equations are critical for proper scaling of graphical images to television images;

maintenance of correct aspect ratio of image through proper choice of memory read clock and total graphics pixels per line; and variable image size achievable through selection of scaling ratio (7/8's, 5/6's, 3/4's).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX A

TABLE OF SCALING PARAMETERS IMPLEMENTED IN THE CHRONTEL CH7002 SCAN RATE CONVERTER

|  | PAL OUT 640 × 480 IN | NTSC OUT 640 × 480 IN | PAL OUT 800 × 600 IN | NTSC OUT 800 × 600 IN |
|---|---|---|---|---|
| 1:1 Scale Factor | Mode 1 | Mode 2 | Mode 5 | NA |
| # of VGA Lines | 625 | 525 | 625 | |
| # of VGA Pixels/Line | 800 | 800 | 944 | |
| VGA Horizontal Freq. (KHz) | 31.2500 | 31.4685 | 31.2500 | |
| VGA Pixel Freq. (Mhz) | 25.0000 | 25.1748 | 29.5000 | |
| A/D Clock Freq. (Mhz) | 25.0000 (800) | 25.1748 (800) | 25.0000 (800) | |
| D/A Clock Freq (Mhz) | 28.1250 (900) | 25.1748 (800) | 25.0000 (800) | |
| # of TV Lines | 625 | 525 | 625 | |
| # of TV Pixels/TV Line | 1800 | 1600 | 1600 | |
| Over/Under Scan (%) | −16 V, −13 H | 0 V, −2 H | +4 | |
| Aspect Ratio (Hor/Ver) | 1.040/1 | 0.975/1 | 0.9.97/1 | |
| 1:1 7:8 Scale Factor | NA | Mode 3 | NA | NA |
| # of VGA Lines | | 600 | | |
| # of VGA Pixels/Line | | 784 | | |
| VGA Horizontal Freq. (KHz) | | 35.9640 | | |
| VGA Pixel Freq. (Mhz) | | 28.1958 | | |
| A/D Clock Freq. (Mhz) | | 28.1958 (784) | | |
| D/A Clock Freq (Mhz) | | 28.1958 (784) | | |
| # of TV Lines | | 525 | | |
| # of TV Pixels/TV Line | | 1792 | | |
| Over/Under Scan (%) | | −13 | | |
| Aspect Ratio (Hor/Ver) | | 0.995/1 | | |
| 1:1 5:6 Scale Factor | NA | NA | Mode 0 | NA |
| # of VGA Lines | | | 750 | |
| # of VGA Pixels/Line | | | 944 | |
| VGA Horizontal Freq. (KHz) | | | 37.5000 | |
| VGA Pixel Freq. (Mhz) | | | 35.4000 | |
| A/D Clock Freq. (Mhz) | | | 30.0000 (800) | |
| D/A Clock Freq (Mhz) | | | 30.0000 (800) | |
| # of TV Lines | | | 625 | |
| # of TV Pixels/TV Line | | | 1920 | |
| Over/Under Scan (%) | | | −13 | |
| Aspect Ratio (Hor/Ver) | | | 0.998/1 | |
| 1:1 3:4 Scale Factor | NA | NA | NA | Mode 6 |
| # of VGA Lines | | | | 700 |
| # of VGA Pixels/Line | | | | 1040 |
| VGA Horizontal Freq. (KHz) | | | | 41.9581 |
| VGA Pixel Freq. (Mhz) | | | | 43.6364 |
| A/D Clock Freq. (Mhz) | | | | 33.5664 (800) |
| D/A Clock Freq (Mhz) | | | | 25.1748 (800) |
| # of TV Lines | | | | 525 |
| # of TV Pixels/TV Line | | | | 1600 |
| Over/Under Scan (%) | | | | −6 |
| Aspect Ratio (Hor/Ver) | | | | 0.999/1 |
| 1:1 7:6 Scale Factor | NA | NA | NA | NA |
| # of VGA Lines | | | | |
| # of VGA Pixels/Line | | | | |
| VGA Horizontal Freq. (KHz) | | | | |
| VGA Pixel Freq. (Mhz) | | | | |
| A/D Clock Freq. (Mhz) | | | | |
| D/A Clock Freq (Mhz) | | | | |
| # of TV Lines | | | | |
| # of TV Pixels/TV Line | | | | |
| Over/Under Scan (%) | | | | |
| Aspect Ratio (Hor/Ver) | | | | |

APPENDIX B

| TABLE OF POSSIBLE SCALING PARAMETERS | | | | |
|---|---|---|---|---|
| | PAL OUT 640 × 480 IN | NTSC OUT 640 × 480 IN | PAL OUT 800 × 600 IN | NTSC OUT 800 × 600 IN |
| 1:1 1:1 Scale Factor | | | | NA |
| # of VGA Lines | 625 | 525 | 625 | |
| # of VGA Pixels/Line | 840 | 784 | 840 | |
| VGA Horizontal Freq. (KHz) | 31.2500 | 31.4685 | 31.2500 | |
| VGA Pixel Freq. (Mhz) | 26.2500 | 24.6713 | 26.2500 | |
| A/D Clock Freq. (Mhz) | 26.2500 (840) | 24.6713 (784) | 26.2500 (840) | |
| D/A Clock Freq (Mhz) | 29.5313 (945) | 24.6713 (784) | 29.5313 (945) | |
| # of TV Lines | 625 | 525 | 625 | |
| # of TV Pixels/TV Line | 1890 | 1568 | 1890 | |
| Over/Under Scan (%) | −17 | 0 | +4 | |
| Aspect Ratio (Hor/Ver) | 0.996/1 | 0.995/1 | 0.997/1 | |
| 1:1 7:8 Scale Factor | | | | NA |
| # of VGA Lines | 712 | 600 | 712 | |
| # of VGA Pixels/Line | 840 | 784 | 840 | |
| VGA Horizontal Freq. (KHz) | 35.7143 | 35.9640 | 35.7143 | |
| VGA Pixel Freq. (Mhz) | 30.0000 | 28.1958 | 30.0000 | |
| A/D Clock Freq. (Mhz) | 30.0000 (840) | 28.1958 (784) | 30.9000 (840) | |
| D/A Clock Freq (Mhz) | 33.7500 (945) | 28.1958 (784) | 33.7500 (945) | |
| # of TV Lines | 623 | 525 | 623 | |
| # of TV Pixels/TV Line | 2160 | 1792 | 2160 | |
| Over/Under Scan (%) | −27 | −13 | −9 | |
| Aspect Ratio (Hor/Ver) | 0.996/1 | 0.995/1 | 0.997/1 | |
| 1:1 5:6 Scale Factor | | | | |
| # of VGA Lines | 750 | 630 | 750 | 630 |
| # of VGA Pixels/Line | 840 | 800 | 840 | 1040 |
| VGA Horizontal Freq. (KHz) | 37.5000 | 37.7622 | 37.5000 | 37.7622 |
| VGA Pixel Freq. (Mhz) | 31.5000 | 30.2098 | 31.5000 | 39.2727 |
| A/D Clock Freq. (Mhz) | 31.5000 (840) | 30.2098 (800) | 31.5000 (840) | 31.7203 (840) |
| D/A Clock Freq (Mhz) | 35.4375 (945) | 30.2098 (800) | 35.4375 (945) | 23.7902 (630) |
| # of TV Lines | 625 | 525 | 625 | 525 |
| # of TV Pixels/TV Line | 2268 | 1920 | 2268 | 1512 |
| Over/Under Scan (%) | −31 | −17 | −13 | +4 |
| Aspect Ratio (Hor/Ver) | 0.997/1 | 0.975/1 | 0.997/1 | 0.999/1 |
| 1:1 3:4 Scale Factor | | | | |
| # of VGA Lines | 836 | 700 | 836 | 700 |
| # of VGA Pixels/Line | 840 | 792 | 840 | 1040 |
| VGA Horizontal Freq. (KHz) | 41.6667 | 41.9581 | 41.6667 | 41.9581 |
| VGA Pixel Freq. (Mhz) | 35.0000 | 33.2308 | 35.0000 | 43.6364 |
| A/D Clock Freq. (Mhz) | 35.0000 (840) | 33.2308 (792) | 35.0000 (840) | 35.2448 (840) |
| D/A Clock Freq (Mhz) | 39.3750 (945) | 33.2308 (792) | 39.3750 (945) | 26.4336 (630) |
| # of TV Lines | 627 | 525 | 627 | 525 |
| # of TV Pixels/TV Line | 2520 | 2112 | 2520 | 1680 |
| Over/Under Scan (%) | −38 | −25 | −22 | −6 |
| Aspect Ratio (Hor/Ver) | 0.997/1 | 0.985/1 | 0.996/1 | 0.999/1 |
| 1:1 7:6 Scale Factor | | NA | NA | NA |
| # of VGA Lines | 534 | | | |
| # of VGA Pixels/Line | 840 | | | |
| VGA Horizontal Freq. (KHz) | 26.7857 | | | |
| VGA Pixel Freq. (Mhz) | 22.5000 | | | |
| A/D Clock Freq. (Mhz) | 22.5000 (840) | | | |
| D/A Clock Freq (Mhz) | 25.3125 (945) | | | |
| # of TV Lines | 623 | | | |
| # of TV Pixels/TV Line | 1620 | | | |
| Over/Under Scan (%) | −3 | | | |
| Aspect Ratio (Hor/Ver) | 0.997/1 | | | |

What is claimed is:

1. A method to convert computer graphics signals to television video signals with vertical and horizontal scaling, comprising the steps of:

(1) based on a predetermined computer image format associated with an input image represented by the computer graphics signals and a predetermined television display format in which the television video signals representing a corresponding television image are to be displayed, determining:

a television display lines per frame setting (TVLPF) representing the desired number of television lines per frame, a television horizontal frequency setting (TVHF), a graphics display lines per frame setting (GLPF), where the GLPF is related to the TVLPF according to the expression GLPF=TVLPF/K, where K is defined to be a fractional scale factor representing percentage of vertical scaling to be applied to the input image, a graphics horizontal frequency setting (GHF) related to the TVHF according to the expression GHF=(2*TVHF)/K, a graphics pixels per line setting (GPPL) and a television pixels per line setting (TVPPL), wherein the ratio of the GPPL to the TVPPL is proportional to the ratio of the TVLPF to the GPLPF, and a graphics pixel clock frequency setting (GPF) related to the GPPL and the GHF according to the expression GPF=GHF*GPPL;

(2) controlling a video source providing the computer graphics signals so that computer graphics pixels composing the computer graphics signals are provided in accordance with the determined GHF, GLPF, GPPL and GPF;

(3) providing a readout clock running at a television pixel frequency (TVPF) that governs the rate at which television pixels composing the television signals are provided, the TVPF being defined by the expression TVPF=TVHF*TVPPL;

(4) providing storage for at most 2*GPPL of the graphics pixels;

(5) storing no more than GPPL pixels per new line of the computer graphics signals as the new line graphics signals are provided, each newly stored pixel being selected from (a) a linear combination of a previously stored pixel and a pixel from the new line graphics signals and (b) the pixel from the new line;

(6) when the pixel clock indicates the beginning of a new graphics line:

determining screen position of the new graphics line relative to screen positions of a predetermined subset of graphics lines to be used to form a new television line and screen position of the new television line being generated, and subsequently reading out the television signals for the new television line, wherein each television signal pixel composing the new television line represents a weighted sum of corresponding stored graphics pixels from the predetermined subset that minimizes flicker in the television image by compensating for differences in the screen positions of the new television line and each of the predetermined subset; and (7) when the readout clock indicates that all stored graphics pixels of the predetermined subset have been processed, reading out blank television pixels for the new television line until the total of the television pixels read out for the new television line equals the TVPPL;

the television image thereby fitting fully within the television display and having an aspect ratio identical to the aspect ratio of the image.

2. The method of claim 1, wherein:

the predetermined subset of the stored lines comprises stored lines of the input image that fall within a predefined distance of the new television line;

the screen position determining step comprises determining respective degree of overlap between each member line of the predetermined subset distance and the new television line; and weights used to compute the weighted sum comprise a respective weight for each member line that represents the degree of overlap between that member line and the new television line.

3. The method of claim 1, further comprising the steps of:

determining a repeat value (RV) representing a number of input image lines after which the predetermined subset and the new television line are in the same relative positions and the beginning of one member line of the predetermined subset and the new television line coincide;

identifying all possible arrangements of the member lines and the new television line, the total number of different arrangements equaling the RV; and associating a respective set of weights with each different arrangement;

such that the step of reading out the television signals comprises:

when a new input image line begins, determining from values of the pixel clock which of the possible arrangements describes a current arrangement of the member lines and the new television line; and setting the weights used to compute the weighted sum to the respective set of weights associated with the current arrangement.

4. The method of claim 1, further comprising the step of:

defining a set of modes defined by combinations of the predetermined computer image formats and the predetermined television display formats, wherein each of the set of modes defines settings associated with that mode, including:

the television display lines per frame setting (TVLPF), the graphics display lines per frame setting (GLPF), the television pixels per line setting (TVPPL), and the graphics pixels per line setting (GPPL), the television pixel clock frequency setting (TVPF), and the graphics pixel clock frequency setting (GPF).

5. The method of claim 4, wherein the set of modes comprises:

mode 1, wherein the computer image format is 640×480 pixels, the television display format is PAL and the scale factor is 1:1;

mode 2, wherein the computer image format is 640×480 pixels, the television display format is NTSC and the scale factor is 1:1;

mode 5, wherein the computer image format is 800×600 pixels, the television display format is PAL and the scale factor is 1:1;

mode 3, wherein the computer image format is 640×480 pixels, the television display format is NTSC and the scale factor is 7:8;

mode 0, wherein the computer image format is 800×600 pixels, the television display format is PAL and the scale factor is 5:6; and mode 6, wherein the computer image format is 800×600 pixels, the television display format is NTSC and the scale factor is 3:4.

6. The method of claim 1, wherein the GPPL and TVPPL determining step comprises:

determining, when the method is implemented using a single phase locked loop (PLL), graphics pixels per line (GPPL) and television pixels per line (TVPPL) so that the following equation holds:

$$\frac{TVPPL \times TVLPF}{GLPF} = \text{integer} = GPPL$$

determining, when the method is implemented using two PLLs, graphics pixels per line (GPPL) and television pixels per line (TVPPL) so that the following equation holds, wherein the factor 1/2*P/Q provides the ratio between television memory read and write frequencies:

$$\frac{TVPPL \times TVLPF}{(P/Q) \times GLPF} = \text{integer} = GPPL$$

7. A method to convert computer graphics signals to television video signals with vertical and horizontal scaling, comprising the steps of:
(1) providing storage for less than a full frame's worth of graphics pixels per video component;
(2) storing the graphics pixels as they are provided so that each newly stored pixel is selected from (a) a linear combination of a previously stored pixel and a pixel from the new line graphics signals and (b) the pixel from the new line; and
(3) in a repeating pattern for every M television lines, where M>2, generating television pixels composing the television video signals from a weighted sum of the stored graphics pixels such that a different precomputed set of weights are used to compute the television pixels for each of the M television lines.

8. The method of claim 7, wherein the precomputed set of weights used to compute the weighted sum comprises a respective weight for each member line within said storage that represents a degree of overlap between that member line and a new television line being generated.

9. A system to convert computer graphics signals to television video signals with vertical and horizontal scaling so that a computer video image can be entirely displayed on a television display, comprising:
a source of computer graphics signals that provides graphics pixels composing the graphics signals in accordance with a selectable graphics pixel frequency (GPF), graphics lines per frame setting (GLPF) and graphics pixels per line setting (GPPL);
storage for less than a full frame's worth of graphics pixels per video component;
a scan rate converter that performs the horizontal and vertical scaling on the computer graphics signals according to a mode determined by format of the television display, format of the video image and a scaling factor, the scan rate converter being configured to:
determine in accordance with the mode: the GPPL, the GLPF, the GPF, television lines per frame (TVLPF), television pixels per line (TVPPL) and television pixel frequency (TVPF) enabling the computer video image to be entirely displayed on the television display;
store the graphics pixels as they are provided so that each newly stored pixel is selected from (a) a linear combination of a previously stored pixel and a pixel from the new line graphics signals and (b) the pixel from the new line; and
in a repeating pattern for every M television lines, where M>2, generate television pixels composing the television video signals from a weighted sum of the stored graphics pixels such that a different precomputed set of weights are used to compute the television pixels for each of the M television lines.

10. The system of claim 9, wherein the storage comprises for each component of the graphics signals:
a first memory providing storage for no more than GPPL pixels responsive to first read and first write signals updated at the GPF;
a second memory providing storage for no more than GPPL pixels responsive to a second write clock updated at the GPF and a second read clock updated at the TVPF, the output of the second memory providing the television pixels; and the scan converter further comprises:
a first ALU having inputs coupled to the output of the first memory and the graphics signals and an output coupled to the first memory; and
a second ALU having inputs coupled to the output of the first memory and the graphics signals and output coupled to the second memory;
wherein the scan converter controls the operation of the first and second memories and first and second ALUs in such a manner that graphics pixels from as many as four graphics lines are combined to form the television pixels composing a single television line.

11. The system of claim 10, wherein, when the single television line is being generated from first, second and third adjacent graphics lines,
as the pixels from the second line are received, stored pixels from the first line are read out from the first memory and weighted by a first weight to form a set of weighted first pixels that are added by the first ALU to a set of pixels from the second line weighted with a second weight, the resulting first sum of weighted pixels being stored back into the first memory; and
as the pixels from the third line are received, the stored first sum of weighted pixels are read out from the first memory and added in the second ALU with pixels from the third line weighted by a third weight, the resulting sum of products being stored in the second memory at the graphics pixel frequency and being output as the television signals at the television pixel frequency, the pixels from the third line being stored in the first memory for the generation of the next television line.

12. The system of claim 10, wherein, when the single television line is being generated from first, second, third and fourth adjacent graphics lines,
as the pixels from the second line are received, stored pixels from the first line are read out from the first memory and weighted by a first weight to form a set of weighted first pixels that are added by the first ALU to a set of pixels from the second line weighted with a second weight, the resulting first sum of weighted pixels being stored back into the first memory;
as the pixels from the third line are received, stored pixels from the first sum of weighted pixels are read out from the first memory and added by the first ALU to a set of pixels from the third line weighted with the second weight, the resulting second sum of weighted pixels being stored back into the first memory; and
as the pixels from the fourth line are received, the stored second sum of weighted pixels are read out from the first memory and added in the second ALU with pixels from the fourth line weighted by a third weight, the resulting sum of products being stored in the second memory at the graphics pixel frequency and being output as the television signals at the television pixel frequency, the pixels from the fourth line being stored in the first memory for the generation of the next television line.

13. The system of claim 9, wherein the scan rate converter further comprises a database defining for each supported mode signal settings associated with that mode, wherein the signal settings include:

the television display lines per frame setting (TVLPF), the graphics display lines per frame setting (GLPF), the television pixels per line setting (TVPPL), and the graphics pixels per line setting (GPPL), the television pixel clock frequency setting (TVPF), and the graphics pixel clock frequency setting (GPF).

14. The system of claim 9, wherein the GPPL and TVPPL are determined:

when the method is implemented using a single phase locked loop (PLL), in accordance with the following equation:

$$\frac{TVPPL \times TVLPF}{TLPF} = \text{integer} = GPPL$$

when the method is implemented using two PLLs, in accordance with the following equation, wherein the factor 1/2*P/Q provides the ratio between second memory read and write frequencies:

$$\frac{TVPPL \times TVLPF}{(P/Q) \times GLPF} = \text{integer} = GPPL$$

* * * * *

UNITED STATES PATENT AND TRADEMARK OFFICE
CERTIFICATE OF CORRECTION

PATENT NO. : 5,781,241
DATED : July 14, 1998
INVENTOR(S) : Timothy J. Donovan

It is certified that error appears in the above-identified patent and that said Letters Patent is hereby corrected as shown below:

In column 22, line 3, replace the portion of the equation marked "TLPF" with -- GLPF--.

Signed and Sealed this

Twenty-second Day of September, 1998

Attest:

BRUCE LEHMAN

*Attesting Officer*     *Commissioner of Patents and Trademarks*